(12) United States Patent
Cullen et al.

(10) Patent No.: US 7,826,729 B2
(45) Date of Patent: Nov. 2, 2010

(54) UNDERWATER CAMERA ASSEMBLY

(75) Inventors: Robert M. Cullen, Temple, NH (US);
Stephen G. Boucher, Amherst, NH (US)

(73) Assignee: Airmar Technology Corporation,
Miliford, NH (US)

( * ) Notice: Subject to any disclaimer, the term of this patent is extended or adjusted under 35 U.S.C. 154(b) by 235 days.

(21) Appl. No.: 12/210,400

(22) Filed: Sep. 15, 2008

(65) Prior Publication Data

US 2009/0092385 A1 Apr. 9, 2009

Related U.S. Application Data

(60) Provisional application No. 60/994,033, filed on Sep. 17, 2007.

(51) Int. Cl.
*G03B 17/08* (2006.01)
(52) U.S. Cl. .......................................... 396/25; 348/81
(58) Field of Classification Search ............. 396/25–29; 348/81
See application file for complete search history.

(56) References Cited

U.S. PATENT DOCUMENTS

| 3,065,666 | A | * | 11/1962 | Sampson | 396/27 |
|---|---|---|---|---|---|
| 4,028,730 | A | | 6/1977 | Miller | |
| 4,977,418 | A | | 12/1990 | Canty | |
| 5,089,895 | A | * | 2/1992 | Fraker et al. | 348/373 |
| 5,107,286 | A | | 4/1992 | Sergeant et al. | |
| 6,100,921 | A | | 8/2000 | Rowley | |
| 6,115,060 | A | * | 9/2000 | Rowley | 348/81 |
| 6,795,110 | B1 | | 9/2004 | Kossin | |
| 6,987,527 | B2 | | 1/2006 | Kossin | |
| 7,044,623 | B2 | | 5/2006 | Olsson et al. | |
| 2002/0067424 | A1 | | 6/2002 | Brunner, Jr. | |
| 2006/0008262 | A1 | * | 1/2006 | Watanabe et al. | 396/25 |
| 2007/0110416 | A1 | * | 5/2007 | Yamaguchi et al. | 396/27 |

FOREIGN PATENT DOCUMENTS

GB 2 420 038 A 5/2006
JP 56-013874 10/1981

* cited by examiner

*Primary Examiner*—W. B. Perkey
*Assistant Examiner*—Dennis Hancock
(74) *Attorney, Agent, or Firm*—Hamilton, Brook, Smith & Reynolds, P.C.

(57) ABSTRACT

An underwater camera assembly including a through hull housing having a passage extending therethrough. A flexible camera insert is positioned within the passage of the through hull housing and has a first end with a viewing window secured thereto, and a first sealing region for sealing the passage in a water tight manner.

32 Claims, 18 Drawing Sheets

UNDERWATER CAMERA ASSEMBLY

RELATED APPLICATION

This application claims the benefit of U.S. Provisional Application No. 60/994,033, filed on Sep. 17, 2007. The entire teachings of the above application are incorporated herein by reference.

BACKGROUND

Cameras including video cameras, can be contained within a sealed camera assembly and fitted through the hull of a watercraft for underwater viewing. However, since the camera assembly is exposed to the water, the camera can experience shock or other forces from the water. In addition, in power boats, the camera assembly can experience vibration from the motor. Shock and vibration can affect the performance and life of the camera.

SUMMARY

The present invention provides a camera assembly that can seal a camera in a water tight manner, and can limit the amount of shock and vibration experienced by the camera.

The present invention can provide an underwater camera assembly including a through hull housing having a passage extending therethrough. A flexible camera insert can be positioned within the passage of the through hull housing and have a first end with a viewing window secured thereto, and a first sealing region for sealing the passage in a water tight manner.

In particular embodiments, the flexible camera insert can be formed of a material and have a shape for damping vibration. The passage of the through hull housing can have a circular cross section, and the first sealing region of the flexible camera insert can have a circular periphery for sealing within the passage. The flexible camera insert can have a hollow mid portion extending from the first end and extending within the passage. The hollow mid portion can have a polygonal outer periphery that forms air gaps between the hollow mid portion and the through hull housing, and in some embodiments, can be square. A camera can be positioned within the flexible camera insert and be sealed to a second sealing region located within the first end. The camera can extend within the hollow mid portion. The camera can be cylindrical and the hollow mid portion can have square inner walls that form air gaps between the camera and the hollow mid portion. The flexible camera insert can include a second end extending from the hollow mid portion that has a third sealing region for engaging a cap arrangement for sealing the camera within the flexible camera insert. A securement arrangement can secure the second end of the flexible camera insert to the through hull housing. The flexible camera insert can be formed of thermoplastic material. A generally rigid window mount can be secured to the first end of the flexible camera insert. The viewing window can be secured to the window mount. The window mount can include spline protrusions which engage a mating splined opening in the first end of the flexible camera insert. In another embodiment, the window mount can include an outer mount member with a cavity, and a mount insert. The window can be trapped within the cavity of the outer mount member by the mount insert.

The present invention can also provide a flexible camera insert for an underwater camera assembly including a body formed of flexible material. The body can have a first end with a viewing window secured thereto, and a first sealing region with a circular periphery for sealing within a passage in or through a hull. A second sealing region can be located within the first end for sealing to a camera. A hollow mid portion can extend from the first end and have a rectangular outer periphery and rectangular inner walls. A second end can extend from the mid portion and have a third sealing region for engaging a cap arrangement for sealing the flexible camera insert.

The present invention can also provide an underwater device assembly including a through hull housing having a passage extending therethrough. A flexible device insert can be positioned within the passage of the through hull housing and have a first end with a window secured thereto, and a first sealing region for sealing the passage in a water tight manner.

In particular embodiments, the device can be an electrical device selected from the group consisting of a camera, a light, a transducer, and a sensor.

The present invention can also provide a flexible device insert for an underwater device assembly including a body formed of flexible material. The body can have a first end with a window secured thereto, and a first sealing region with a circular periphery for sealing within a passage through a hull. A second sealing region can be located within the first end for sealing to a device. A hollow mid portion can extend from the first end and have a rectangular outer periphery and rectangular inner walls. A second end can extend from the mid portion and have a third sealing region for engaging a cap arrangement for sealing the device insert.

In particular embodiments, the device can be an electrical device selected from the group consisting of a camera, a light, a transducer, and a sensor.

The present invention can additionally provide a method of housing a camera underwater. A flexible camera insert can be positioned within a passage of a through hull housing. The flexible camera insert can have a first end with a viewing window secured thereto, and a first sealing region for sealing the passage in a water tight manner. A camera can be positioned within the flexible camera insert.

In particular embodiments, the flexible camera insert can be formed of a material and have a shape for damping vibration. The passage of the through hull housing can be provided with a circular cross section, and the first sealing region of the flexible camera insert can have a circular periphery for sealing within the passage. The camera can extend through a hollow mid portion of the flexible camera insert extending from the first end. The hollow mid portion can have a polygonal outer periphery that forms air gaps between the hollow mid portion and the passage of the through hull housing, and in some embodiments, can be square. The camera can be sealed to a second sealing region located in the first end of the flexible camera insert. The camera can be cylindrical and the hollow mid portion can have square inner walls that form air gaps between the camera and the hollow mid portion. The flexible camera insert can have a second end extending from the hollow mid portion that has a third sealing region. The camera can be sealed within the flexible camera insert by sealing a cap arrangement with the third sealing region. The second end of the flexible camera insert can be secured to the through hull housing with a securement arrangement. The flexible camera insert can be formed from thermoplastic material. A generally rigid window mount can be secured to the first end of the flexible camera insert. The viewing window can be secured to the window mount. The window mount can include spline protrusions which engage a mating splined opening in the first end of the flexible camera insert. In another embodiment, the window mount can include an outer mount member with a cavity, and a mount insert. The window can be trapped within the cavity of the outer mount member by the mount insert.

The present invention can further provide a method of housing a camera. The camera can be positioned within a camera insert. The camera insert can have body formed of flexible material. The body can have a first end with a viewing window secured thereto, and a first sealing region with a circular periphery for sealing within a through hull passage. The camera can be sealed to a second sealing region located within the first end. A hollow mid portion of the camera insert can extend around the camera. The hollow mid portion can extend from the first end and have a rectangular outer periphery and rectangular inner walls. A second end of the camera insert can extend from the mid portion. The second end can have a third sealing region for engaging a cap arrangement and sealing the camera within the flexible camera insert.

The present invention can also provide a method of housing a device underwater. A flexible device insert can be positioned within a passage of a through hull housing. The flexible device insert can have a first end with a window secured thereto, and a first sealing region for sealing the passage in a water tight manner. The device can be positioned within the flexible device insert.

In particular embodiments, the device can be an electrical device selected from the group consisting of a camera, a light, a transducer, and a sensor.

The present invention can also provide a method of housing a device. The device can be positioned within a device insert. The device insert can have a body formed of flexible material. The body can have a first end with a window secured thereto, and a first sealing region with a circular periphery for sealing within a through hull passage. The device can be sealed to a second sealing region located within the first end. A hollow mid portion of the device can extend from the first end and have a rectangular outer periphery and rectangular inner walls. A second end of the device insert can extend from the mid portion. The second end can have a third sealing region for engaging a cap arrangement and sealing the device within the flexible device insert.

In particular embodiments, the device can be an electrical device selected from the group consisting of a camera, a light, a transducer, and a sensor.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
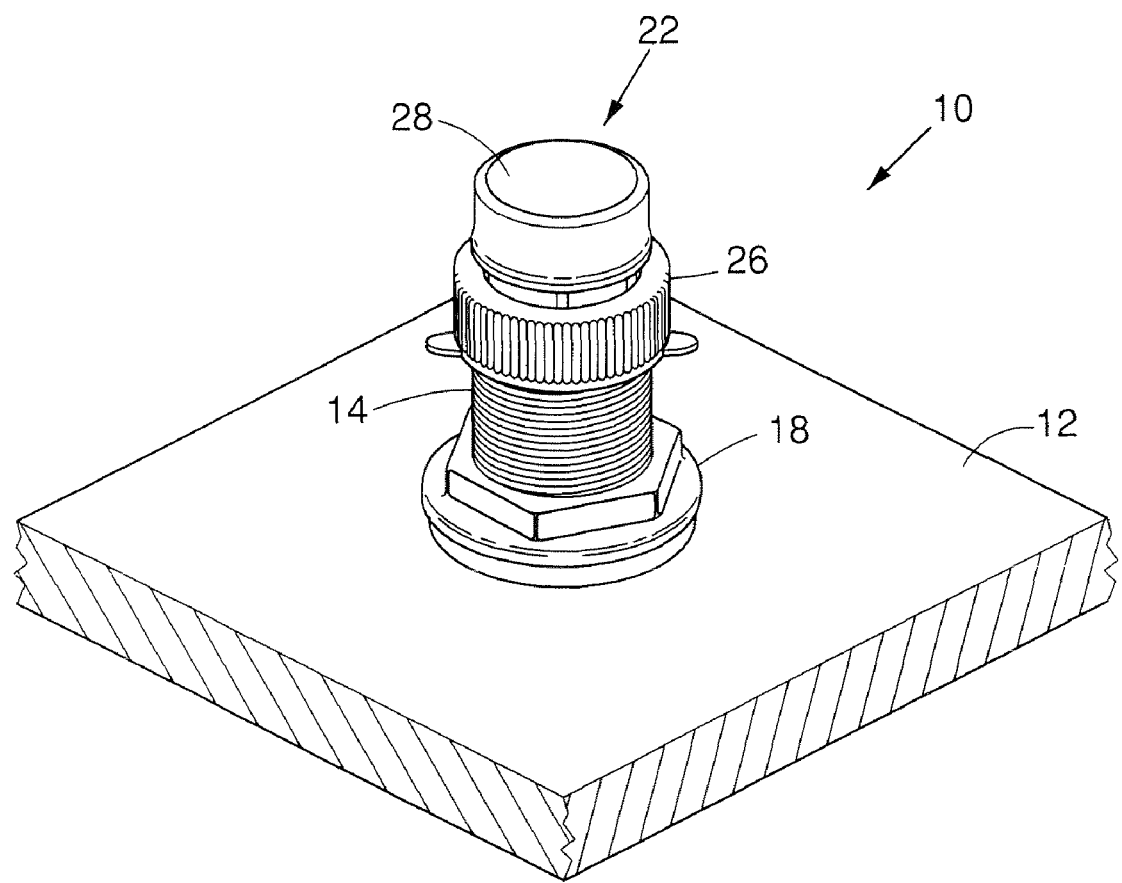
FIG. 1 is a perspective view of an embodiment of a camera assembly mounted to a portion of a hull.

Referring to FIGS. 1-5, camera assembly 10 can be an underwater camera assembly that is mounted to a hull 12 of a watercraft through a passage, hole or opening 12b in the hull 12. The camera assembly 10 can house a camera insert unit or assembly 22, including a camera 30 (FIGS. 4 and 5), such as a still camera, or a video camera for underwater viewing. A video camera can provide active underwater viewing in real time.

Figure 2:
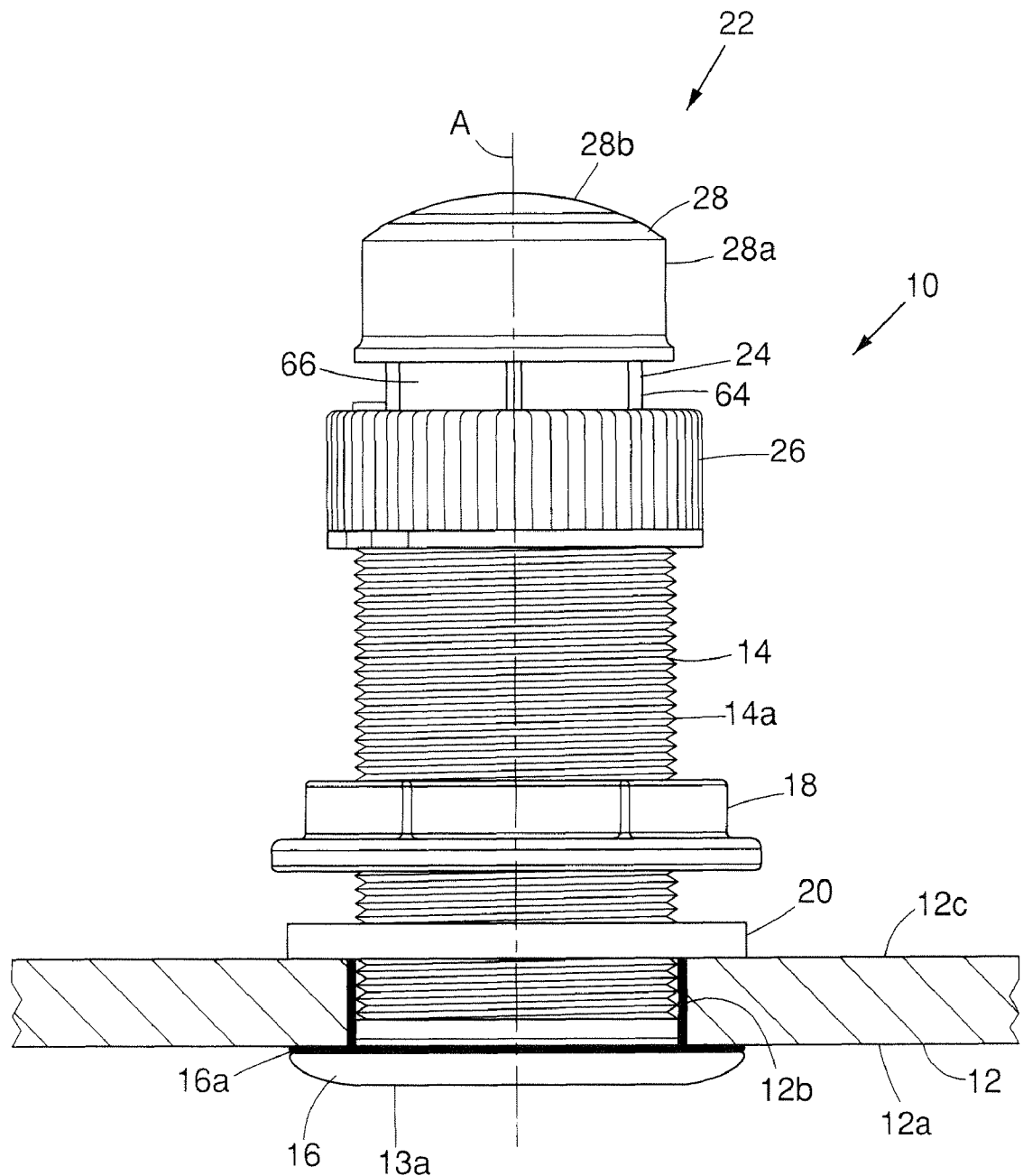
FIG. 2 is a side view of the camera assembly of FIG. 1 mounted to a portion of a hull.
Figure 3:
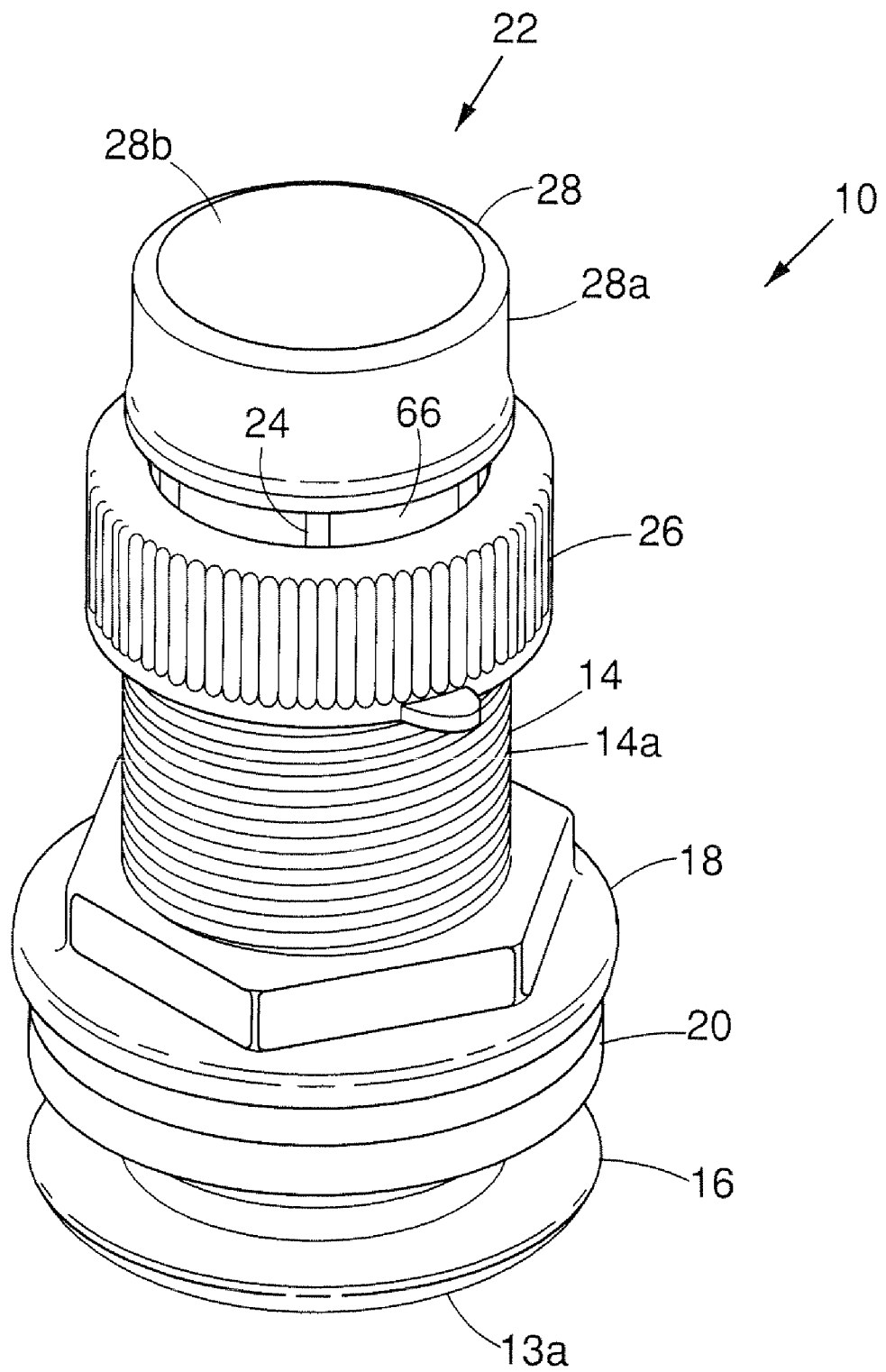
FIG. 3 is a perspective view of the camera assembly.
Figure 7:
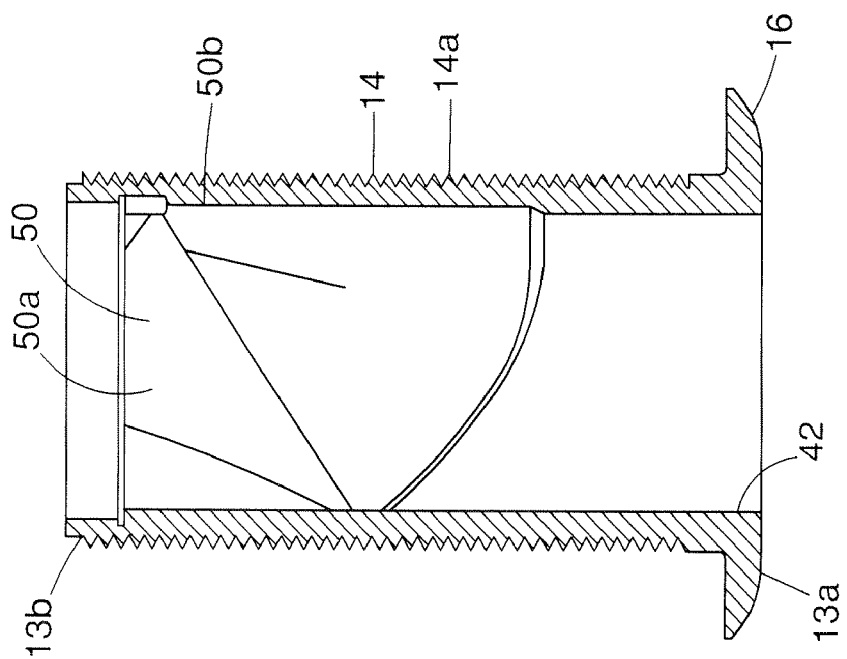
FIG. 7 is a sectional view of an embodiment of a through hull housing.
Figure 6:
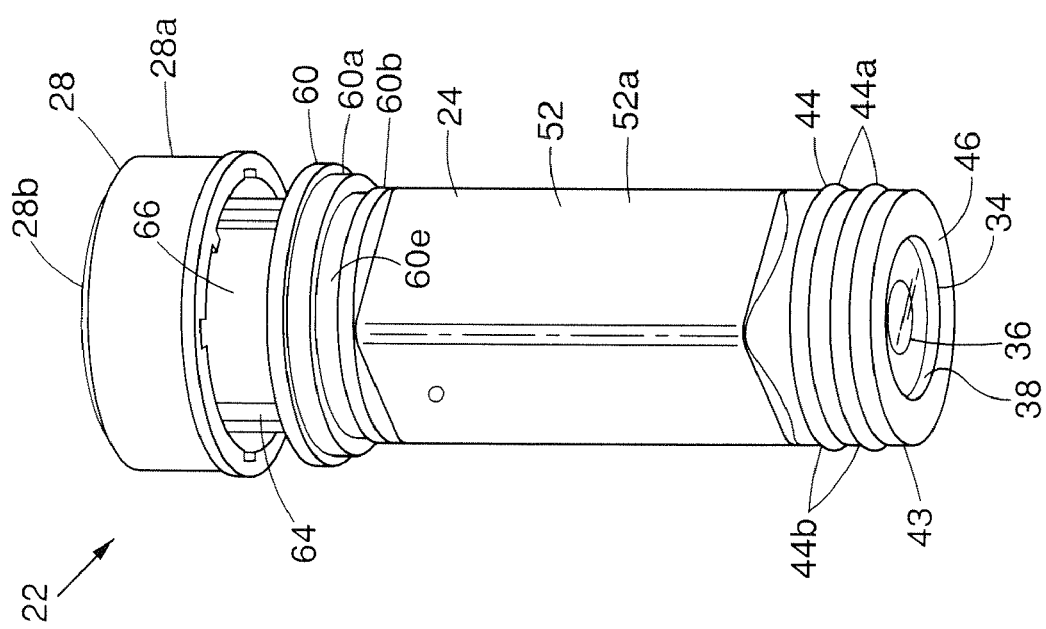
FIG. 6 is a perspective view of an embodiment of a camera insert unit.

The camera assembly 10 can include a through hull housing 14 (FIG. 7) having a passage 42 extending therethrough for housing camera insert unit 22 (FIG. 6) in a watertight or sealed manner. The through hull housing 14 can have a flange 16 at the distal or lower end 13a which is fitted against the outer surface 12a of the wall of the hull 12 (FIGS. 1 and 2). A threaded stem 14a can extend from the flange 16 into the hull 12 through the hole 12b. A threaded nut 18 can engage the threads of the threaded stem 14a on the inside of the hull 12 to lock the through hull housing 14 within hole 12b. An elastomer or rubber washer 20 can be fitted on the threaded stem 14a between the threaded nut 18 and the inner surface 12c of the wall of the hull 12 to compensate or accommodate any irregularities of surface 12c when the threaded nut 18 is tightened. Washer 20 can provide some sealing. A sealant 16a can be positioned between the flange 16 and the outer surface 12a of the wall of the hull 12 to provide watertight sealing between the through hull housing 14 and the hull 12. The sealant 16a can be a viscous adhesive such as a silicone or urethane sealant, and can also be applied around the threaded stem 14a as far as the top of the threaded nut 18 to keep the nut 18 from loosening. Alternatively, in some embodiments, the sealant 16a can be a washer. The through hull housing 14 can include a valve arrangement 50 (FIGS. 4, 5 and 7) having a spring loaded valve member 50a and a sleeve 50b. When no camera insert unit 22 is present within through hull housing 14, the valve member 50a can close the passage 42 to limit or restrict water from entering the hull 12 through passage 42. The insertion of the camera insert unit 22 into the passage 42 can open the valve arrangement 50, pushing the valve member 50a to the side. The passage 42 then becomes sealed by the camera insert unit 22. The through hull housing 14 can be similar to housings described in U.S. Pat. No. 5,186,050, the entire contents of which are incorporated herein by reference.

Figure 8:
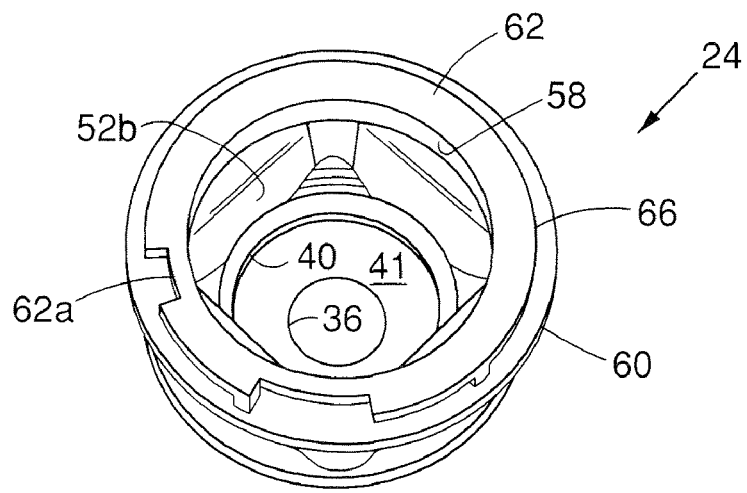
FIG. 8 is an upper perspective view of an embodiment of a camera insert.
Figure 9:
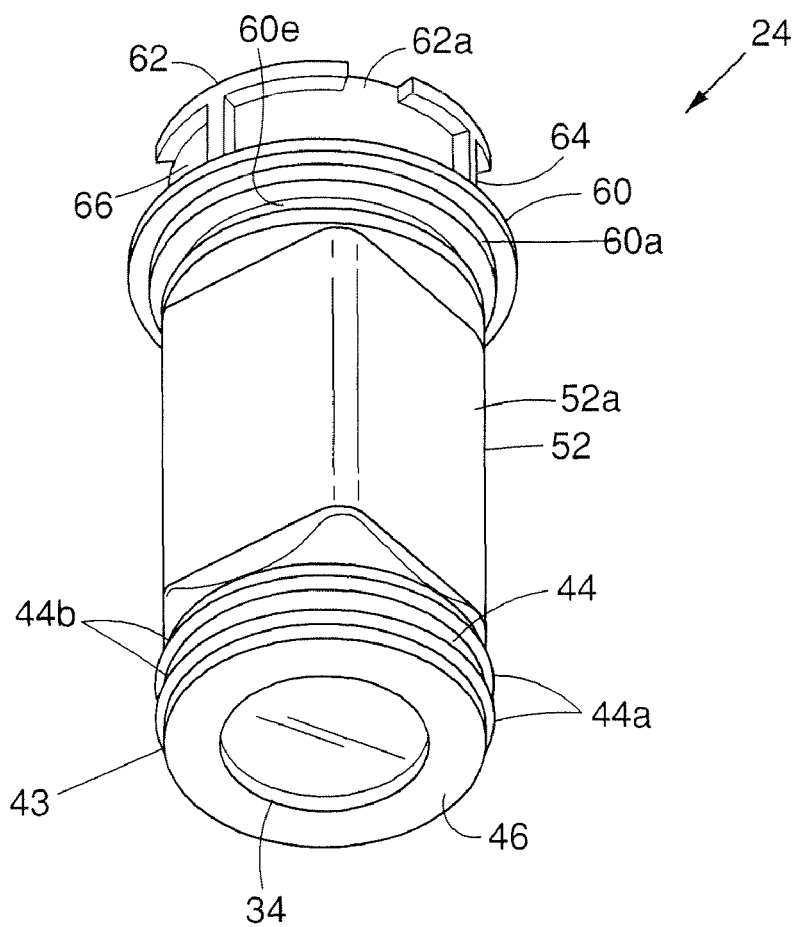
FIG. 9 is a lower perspective view of the camera insert of FIG. 8.

The camera insert unit 22 can be secured to and within the through hull housing 14 along a central axis A by a locking mechanism, such as a threaded ring, nut or cap 26 which can engage the threads of the threaded stem 14a. The camera insert unit 22 can include a camera insert 24 (FIGS. 8 and 9) which houses the camera 30. The camera insert 24 can have a body with a distal lower or first end 43 with a first or outer sealing region 44 for sealing the passage 42 of the through hull housing 14. When the passage 42 of the through hull housing 14 is circular in shape, the first end 43 and the sealing region 44 can have a circular periphery. It is understood that a circular passage 42 can be slightly asymmetric due to shrinkage during the manufacturing process of the through hull housing 14, but is generally considered to be circular. The sealing region 44 can include one or more "O" rings 44a positioned within annular grooves 44b in the first end 43. In one embodiment, two "O" rings 44a can be used. The "O" rings 44a can provide sealing while also compensating for irregularities of the passage 42. The first end 43 can have an aperture, hole or opening 36 through the lower or bottom portion to allow viewing by the camera 30. The opening 36 can include a recess 38 within which a transparent window 34 can be seated and sealed in a watertight manner flush with the surface 46 of the lower or bottom portion. The opening 36, recess 38, and window 34 can be circular in shape. The window 34, surface 46 and flange 16 of the through hull housing 14, can be flush with each other to minimize turbulance or drag when the watercraft is underway. The outer periphery of flange 16 can be shaped or profiled to limit water resistance, for example, curved or angled. The camera 30 can be cylindrical in shape, and the axial lower or distal end 31a can be seated within a circular recess 40 within the first end 43, with the optical opening or lens 32 of the camera 30 being aligned with the opening 36 and window 34 for viewing through the window 34. In one embodiment, the window 34 can be round and can be formed of sapphire. The distal end 31a of the camera 30 can be sealed against a second or internal sealing region of the camera insert 24, such as the bottom or seat 41 of the recess 40, which can form an axial sealing region. The recess 40 can also be sized and configured to provide radial sealing around the periphery of the camera 30.

The camera insert 24 can have a middle body or mid portion 52 extending from the first end 43. The mid portion 52 can have polygonal side walls, such as rectangular or generally square side walls, with generally square outer 52a and inner 52b wall surfaces. The square side walls can provide air gaps, pockets or cavities 48b between the camera 30 and the square inner wall surfaces 52b, and air gaps or cavities 48a between the square outer wall surfaces 52a and the inner surfaces of the passage 42 of the through hull housing 14. The air gaps or cavities 48a and 48b, provided by the square wall structure or configuration, can help isolate and reduce the amount of shock or vibration transferred to the camera 30 from the hull 12 and the through hull housing 14. The air gap 48a reduces the amount of the contacting surface area for shock and vibration transfer between the through hull housing 14 and the camera insert 24, and the air gap 48b reduces the amount of contacting surface area for shock and vibration transfer between the camera insert 24 and the camera 30.

The camera insert 24 can have a proximal upper or second end 66 extending from the mid portion 52. The second end 66 can have securement features for securement to the through hull housing 14 and a third or internal sealing region 58a for sealing the camera 30 in a sealed or watertight manner within the camera insert 24. The second end 66 can have a generally circular periphery and have an outer radial securement or locking shoulder or flange 60 which can be tightened or sandwiched against the proximal upper axial end 13b of the through hull housing 14 by the threaded cap 26. If desired, an "O" ring can be positioned within the threaded cap 26. The flange 60 can have a diameter portion 60a that fits within the passage 42 of the through hull housing 14. Depending upon the tolerances and materials used, this can provide a fourth or outer sealing region 60c for upper sealing of the passage 42 by the second end 66 of the camera insert 24. If desired, an "O" ring 60d within an annular groove 60e can be employed for the fourth or outer sealing region 60c. A radial lip 60b can engage surfaces of the valve arrangement 50. The second end 66 can have a cap retaining flange 62 for securing the cap arrangement 28 over the second end 66. The retaining flange 62 can have recesses 62a (FIGS. 8 and 9) to facilitate engagement and disengagement. An inner diameter portion 58 can extend within the camera insert 24 from flange 60 to flange 62 which can engage a sealing region 56 of the cap arrangement 28 for sealing therebetween at the third sealing region 58a. The outer surfaces of the diameter portion 58 can be reinforced by ribs 64 extending between flanges 60 and 62.

The cap arrangement 28 can include a lower or outer cap portion 28a and an upper or inner cap portion 28b which is fitted to the top of the lower cap portion 28a within an opening 29. The lower cap portion 28a can include a cylindrical neck portion 55 (FIGS. 4 and 5) on which the sealing region 56 is positioned, that engages the inner diameter portion 58 of the camera insert 24. The sealing region 56 can be formed by an "O" ring 56a positioned within an annular groove 56b in the neck portion 55 for engaging and sealing against the inner diameter portion 58 of the camera insert 24. The lower cap portion 28a can have a series of protrusions 29 (FIG. 4) which are directed radially inward for locking the cap arrangement 28 to the cap retaining flange 62 on the camera insert 24. To lock the cap arrangement 28 to the camera insert 24, the protrusions 29 can be inserted through the recesses 62a in the cap retaining flange 62, and then the lower cap portion 28a can be twisted to move or rotate the protrusions 29 under the flange 62. The protrusions 29 can be rotated in position against the ribs 64.

The distal axial end 53 of the neck 55 of the lower cap portion 28a can be secured to the axial upper or proximal end 31b of the camera 30 by a fastener 54 such as a screw. As a result, the camera 30 can be secured within the camera insert 24 at opposite ends 31a and 31b. The cable 30a for the camera 30 can extend into and through the cap arrangement 28 to desired locations in the watercraft for providing electrical communication for the camera 30 and viewing by the user. A potting or sealant material 57 can fill the interior of the neck 55 to encapsulate and provide water tight sealing. The sealing material can be urethane and can surround the cable 30a as well as cover the fastener 54. The encapsulation by the sealant material 57 and the sealing region 56 can seal the upper end of the camera insert 24 to prevent intrusion of water into the camera insert 24 from water that may be inside the hull 12 as well as provide strain relief for the cable 30a.

Figure 4:
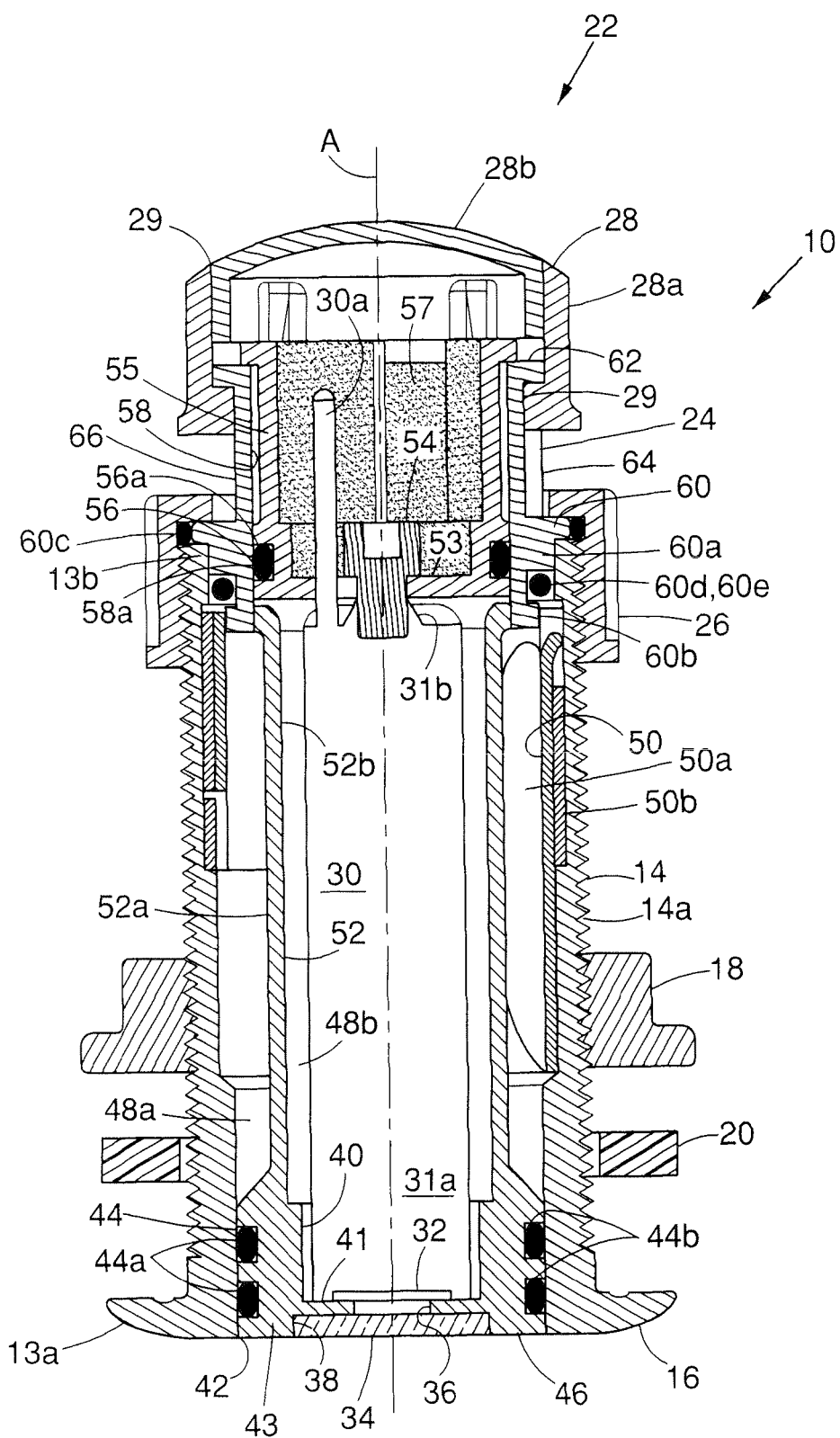
FIG. 4 is a sectional view of the camera assembly.
Figure 5:
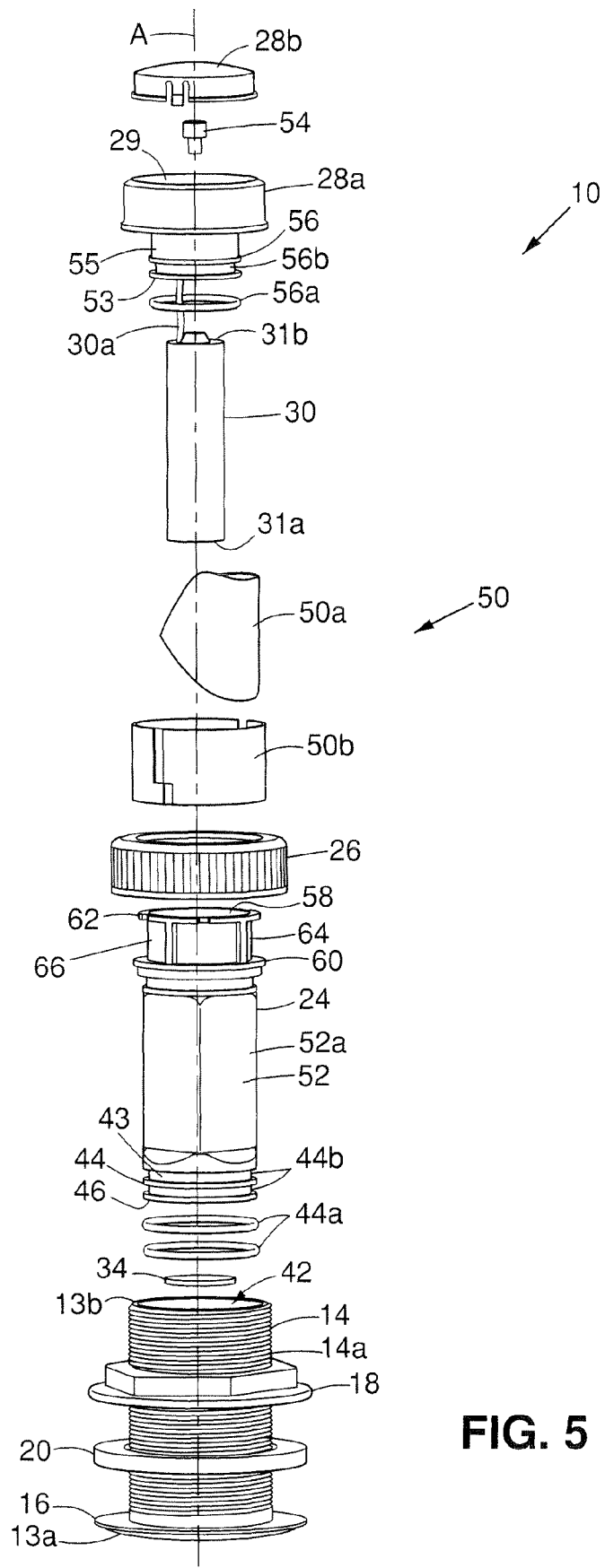
FIG. 5 is an exploded view of the camera assembly.

Referring to FIG. 4, the mid portion 52 of camera insert 24 can be generally spaced from the through hull housing 14 and the camera 30. However, the camera 30 can contact the first end 43 of the camera insert 24 which contacts the through hull housing 14, and the camera 30 can also contact the cap arrangement 28 which contacts the proximal upper or second end 66 of the camera insert 24, which in turn contacts the through hull housing 14. Further isolation and reduction of shock and vibration transfer to the camera 30 can be provided by forming the camera insert 24 from a resilient, flexible, compliant, or soft, vibration absorbing or damping material.

Various suitable rubbers, elastomers, polymers or foam materials can be employed. The camera insert 24 can be formed in one integral piece. The damping material of the camera insert 24 can reduce the transmission of shock and vibration from the hull 12 and through hull housing 14, to the camera 30 through the portions that are in contact with the through hull housing 14 and the camera 30. In one embodiment, the camera insert 24 can be formed of a thermoplastic rubber or elastomer such as Santoprene® thermoplastic rubber. One embodiment can be formed of Santoprene® grade 8201-90 and can have a durometer value of 90 Shore A. Other suitable flexible materials can also be employed. The through hull housing 14 can be made of a glass filled plastic resin such as Valox® which can shrink asymmetrically. The flexible material of the camera insert 24 can allow the camera insert 24 to slightly deform to compensate for irregularities of the passage 42 in the through hull housing 14, for example, being slightly out of round or egg shaped. This can allow the sealing regions and "O" rings to conform to the irregular shape and provide sealing within the irregularly shaped passage 42. Depending upon the flexible material used for camera insert 24, the "O" rings 44a or other suitable sealing structures can be molded on the first end 43 instead of using individual "O" rings 44a positioned within grooves. In other embodiments, the annular grooves 44b can include rigid surfaces, for example, rigid groove members that are positioned within the first end 43 to receive the "O" rings 44a and provide support for the "O" rings 44a. The seals 16a and 20 can also be formed of resilient materials that provide some damping benefits.

Figure 10:
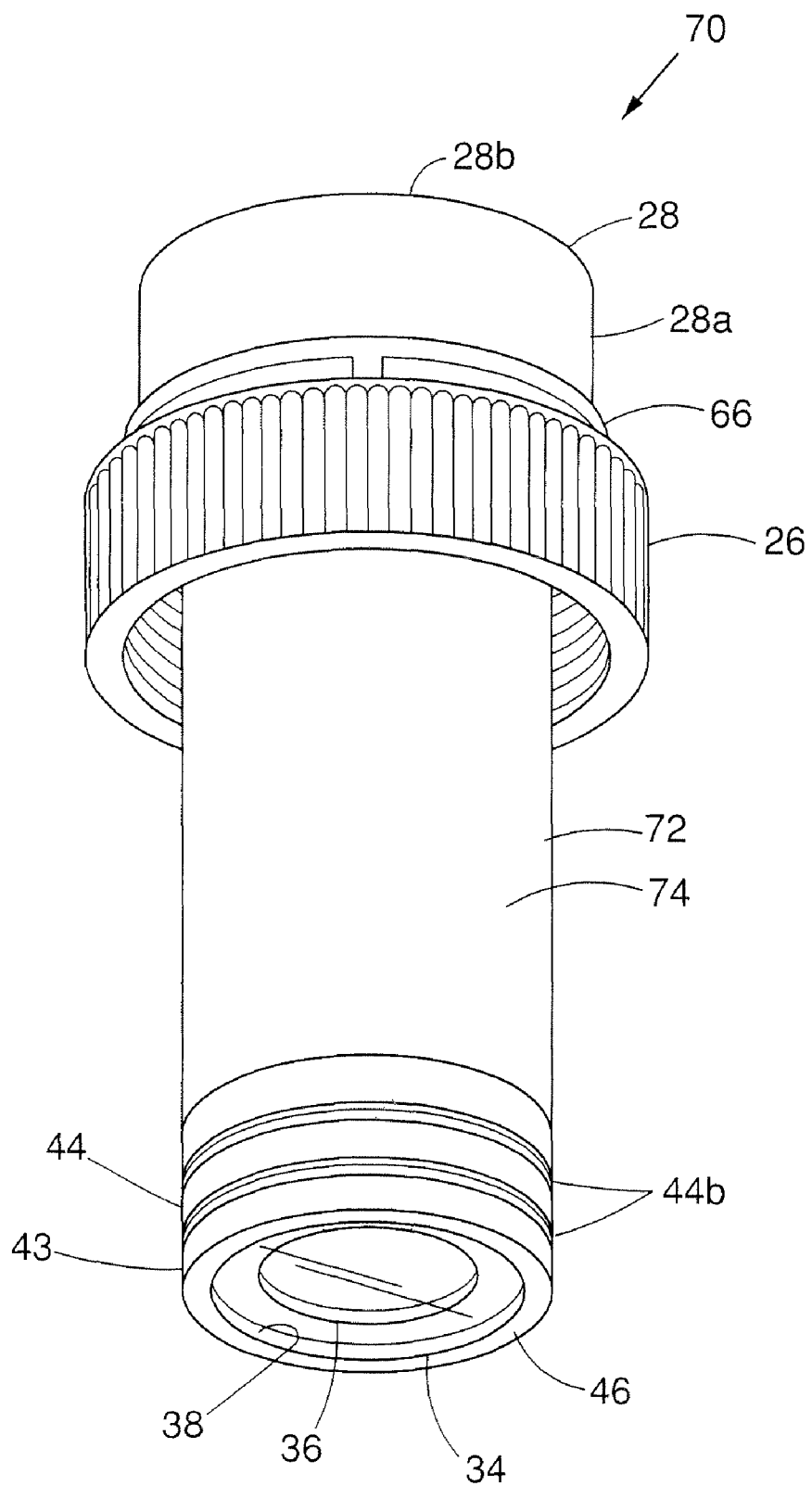
FIG. 10 is a perspective view of another embodiment of a camera insert unit.

Referring to FIG. 10, camera insert unit 70 is another embodiment of a camera insert unit which can include a camera insert 72 having a middle body or mid portion 74 that is cylindrical in shape and formed of flexible, resilient, compliant or soft, vibration and shock damping material. The camera insert 72 can have first 43 and second 66 ends that are formed of the same material as the mid portion 74, or alternatively, can be made of different materials, for example, the first 43 and second 66 ends can be formed of rigid materials, and the mid portion 74 can be formed of more flexible material. Camera insert 24 can also be formed in such a manner. The mid portion 74 of camera insert 72 can provide an air gap or cavity around the camera 30 and/or between the passage 42 of the through hull housing 14, or alternatively, can have a close fit and rely on damping qualities of the flexible material. If desired, the mid portion 74 can be omitted, and in some embodiments, the first 43 and second 66 ends can be connected together by tie rods or connectors. A sealant such as urethane can be poured around the camera 30. In other embodiments, the mid portion 74 can have other suitable shapes and configurations.

Figure 11:
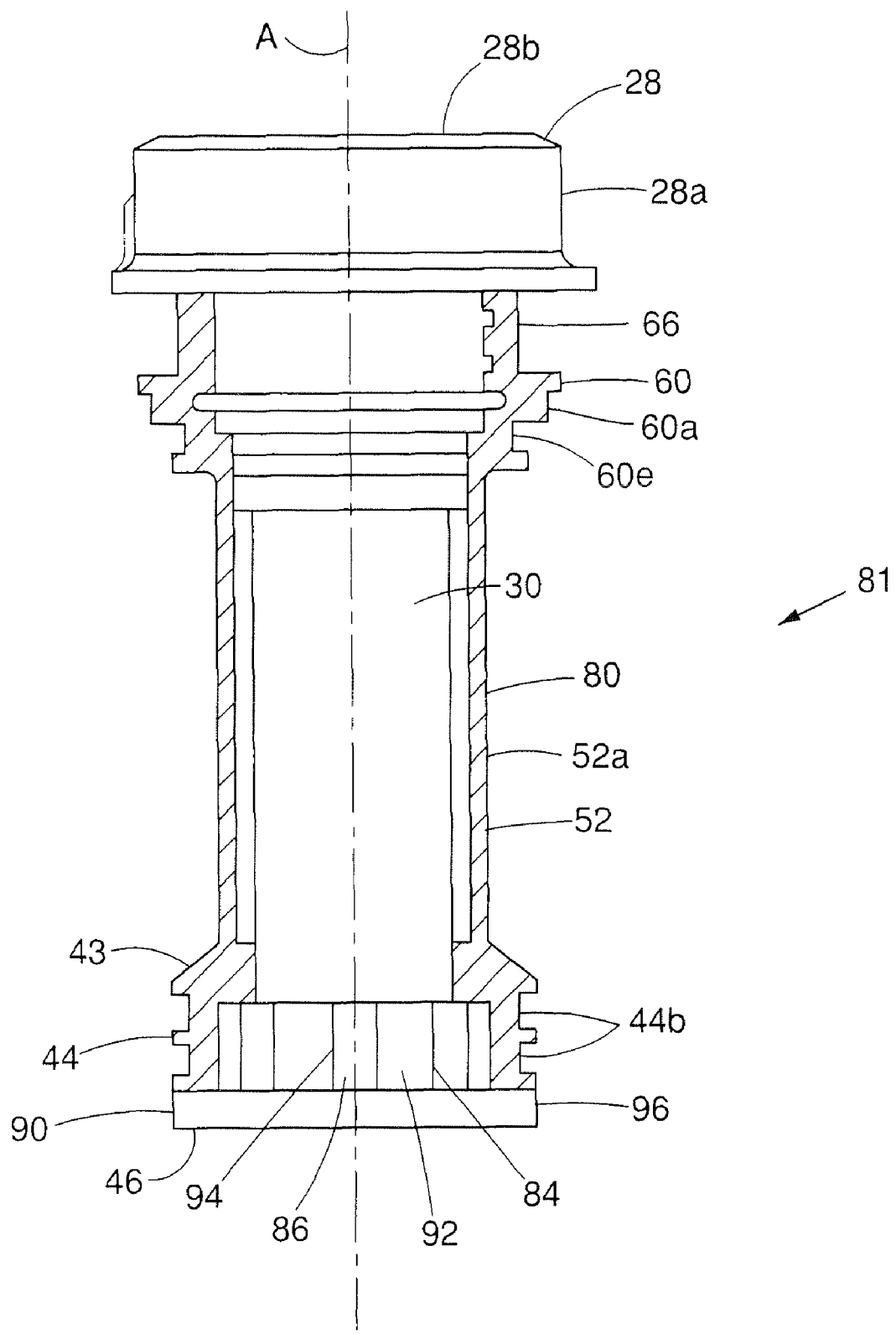
FIG. 11 is a side sectional view of another embodiment of a camera insert unit.
Figure 12:
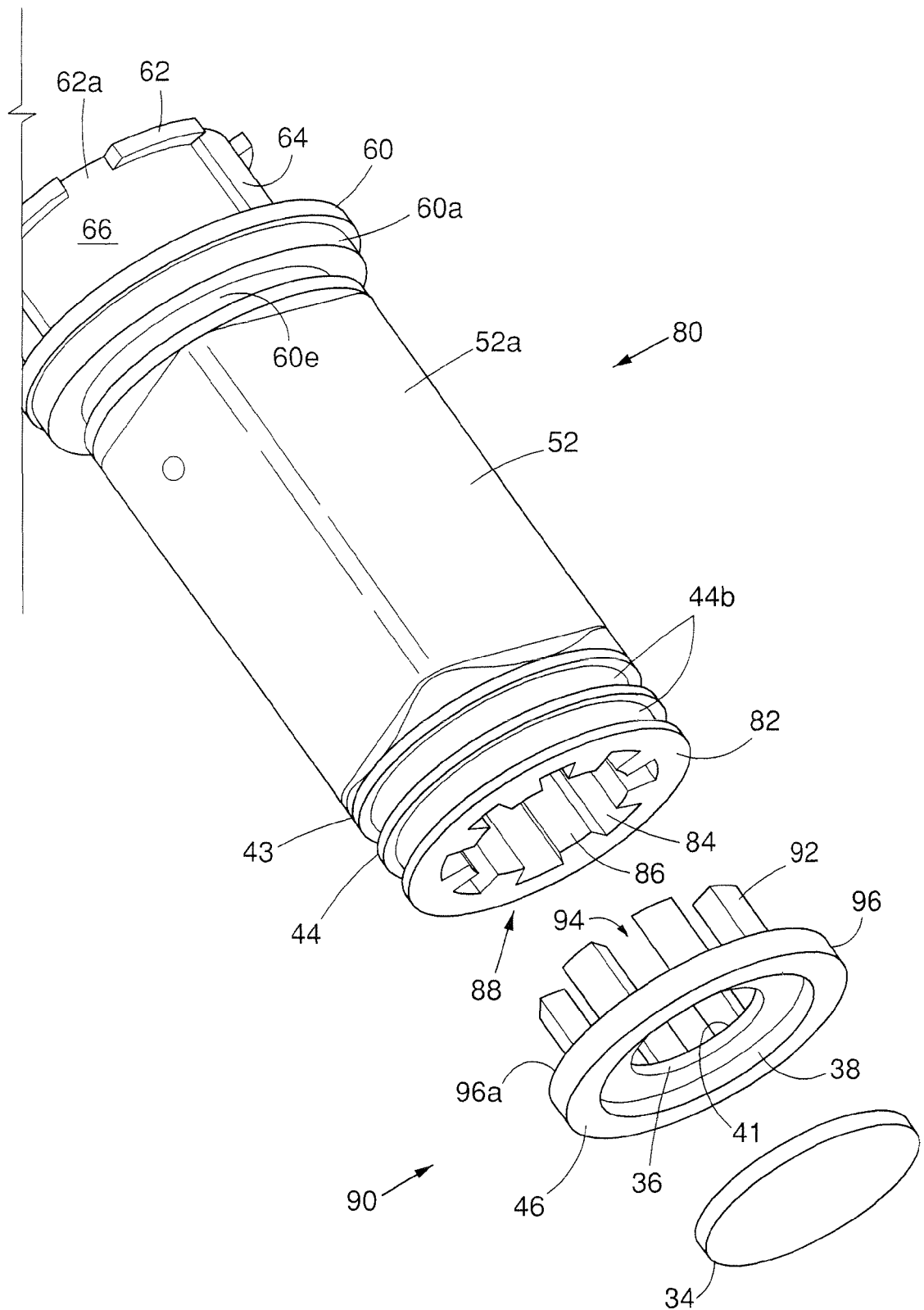
FIG. 12 is a perspective view of the camera insert of FIG. 1 and a window mount for the window.

Referring to FIGS. 11 and 12, camera insert unit 81 is another embodiment of a camera insert unit which differs from camera insert unit 22 in that it includes camera insert 80 and a generally rigid window mount 90 having a window 34. Camera insert 80 differs from camera insert 24 in that the window mount 90 is secured to the first end 43 of the camera insert 80. The window mount 90 can be formed of a generally rigid plastic material, for example, a polycarbonate blend, such as Xenoy®, or a glass filled plastic such as Valox®. Alternately, other suitable materials can be employed. The camera insert 80 can have a splined opening 88 in the first end 43 for engaging mating spline protrusions 92 of the window mount 90. The splined opening 88 has a series of longitudinal spline protrusions 86 which extend within the first end 43 for about the length of the sealing region 44. The spline protrusions 86 can be spaced apart from each other by longitudinal recesses grooves or gaps 84, which can have a width that is about the same as the width of the spline protrusions 86.

The spline protrusions 92 of the window mount 90 can extend from a ring shaped base 96 and can be spaced apart from each other by recesses or gaps 94. The width of the spline protrusions 92 can be about the same as the width of the recesses 94. The spline protrusions 92 can be arranged in an annular pattern and can be inserted into the recesses 84 between the spline protrusions 86 of the splined opening 88, and the recesses 94 of the window mount 90 can accept and engage the spline protrusions 86. This can lock the window mount 90 to the first end 43 of the camera insert 80 in a manner which can prevent rotation of the window mount 90. Structures or protrusions can also be included for providing axial locking. The spline protrusions 92 of the window mount 92 can extend for about the length of the sealing region 44 and can provide stability for the sealing region 44. The spline protrusions 86 and 92, and the recesses 84 and 94, can be about the same size for a tight fit in which the spline protrusions 86 experience some compression. Alternatively, the recesses 94 can be sized for a looser fit. The base 96 of the window mount 90 can have a shoulder 96a which engages against the axial bottom or end surface 82 of the first end 43. An adhesive can be used for securing the window mount 90 in place and providing watertight sealing between the mating surfaces of the window mount 90 and the camera insert 80. An adhesive such as 3M Scotch-Weld™ two part acrylic based structural plastic adhesive Dp-8005 can be employed, for example, for bonding the window mount 90 to the camera insert 80, or other Xenoy® and Santoprene® components together.

The window mount 90 can have an opening 36 to allow viewing by the camera 30 and a recess 38 within which the window 34 can be seated, secured and sealed with adhesives flush with surface 46. The generally rigid window mount 90 can allow the window 24 to be adhered and sealed to a stable substrate which is secured to the first end 43.

The camera 30 can be seated against a seat 41 in the window mount 90 which can form a second sealing region located or positioned within the first end 43. The camera 30 can be positioned within the spline protrusions 86 of the splined opening 88 and the spline protrusions 92 of the window mount 90. In the embodiment shown in FIGS. 11 and 12, there can be eight spline protrusions 86, eight spline protrusions 92, eight recesses 84, and eight recesses 94. The outer and inner radial surfaces of the spline protrusions 92, the radial surfaces of recesses 84, and the radial surfaces of spline protrusions 86 can be curved. Alternatively, the protrusions and recesses can have other suitable shapes, and do not have to be identical. In addition, the protrusions 92 can be pins which can be inserted into recesses or holes in the first end 43.

Figure 13:
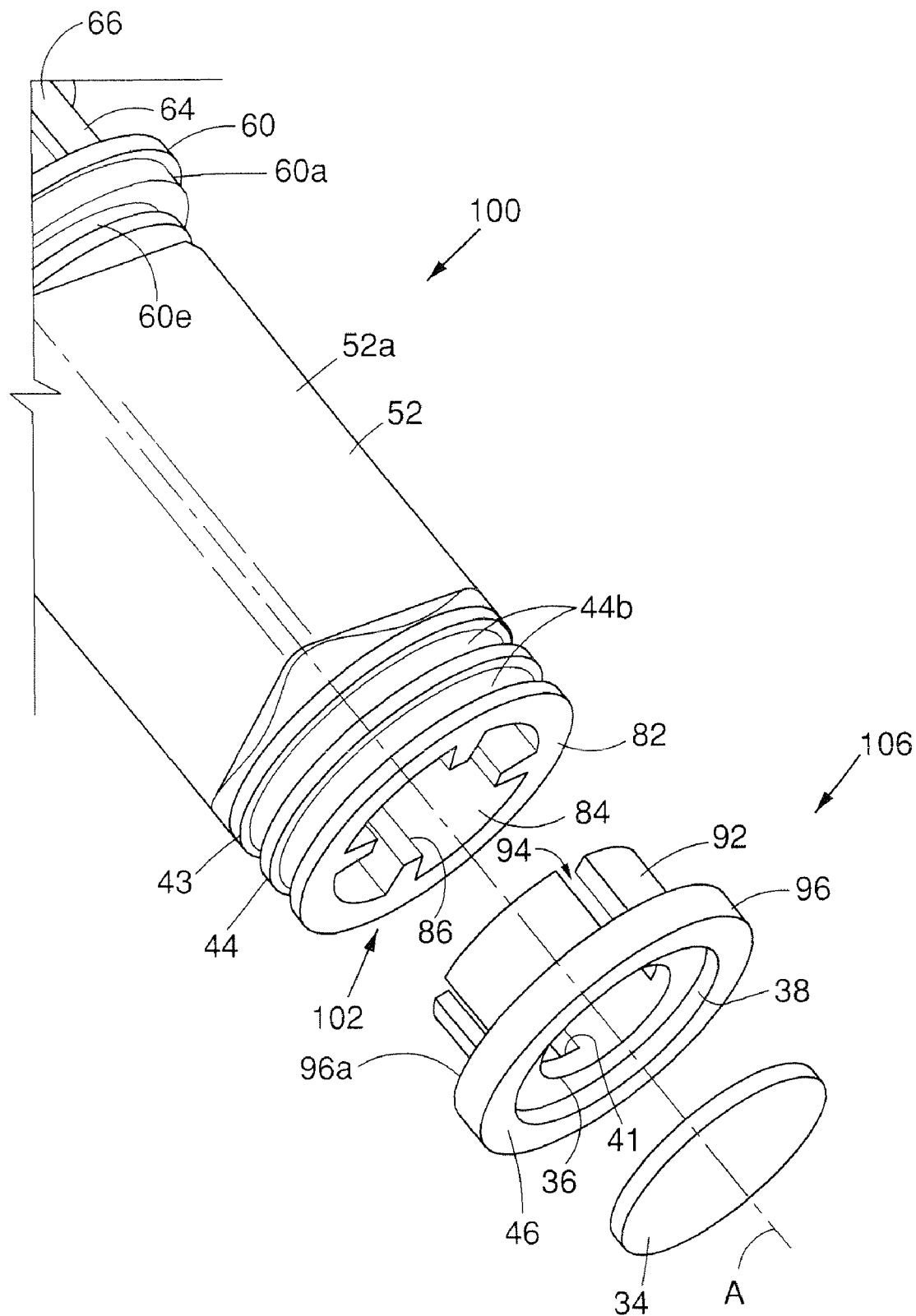
FIG. 13 is a perspective view of another embodiment of a camera insert and a window mount for the window.

Referring to FIG. 13, camera insert 100 differs from camera insert 80 in that the camera insert 100 has a splined opening 102 having four spline protrusions 86 evenly spaced from each other by large recesses 84. A window mount 106 engages the splined opening 102, and differs from window mount 90 in that there are four wide or large spline protrusions 92 which engage the large recesses 84, and four narrow or small recesses 90 which engage the spline protrusions 86. As a result, the large spline protrusions 92 and the large recesses 84 are separated by respective narrow recesses 94 and narrow spline protrusions 86.

Figure 14:
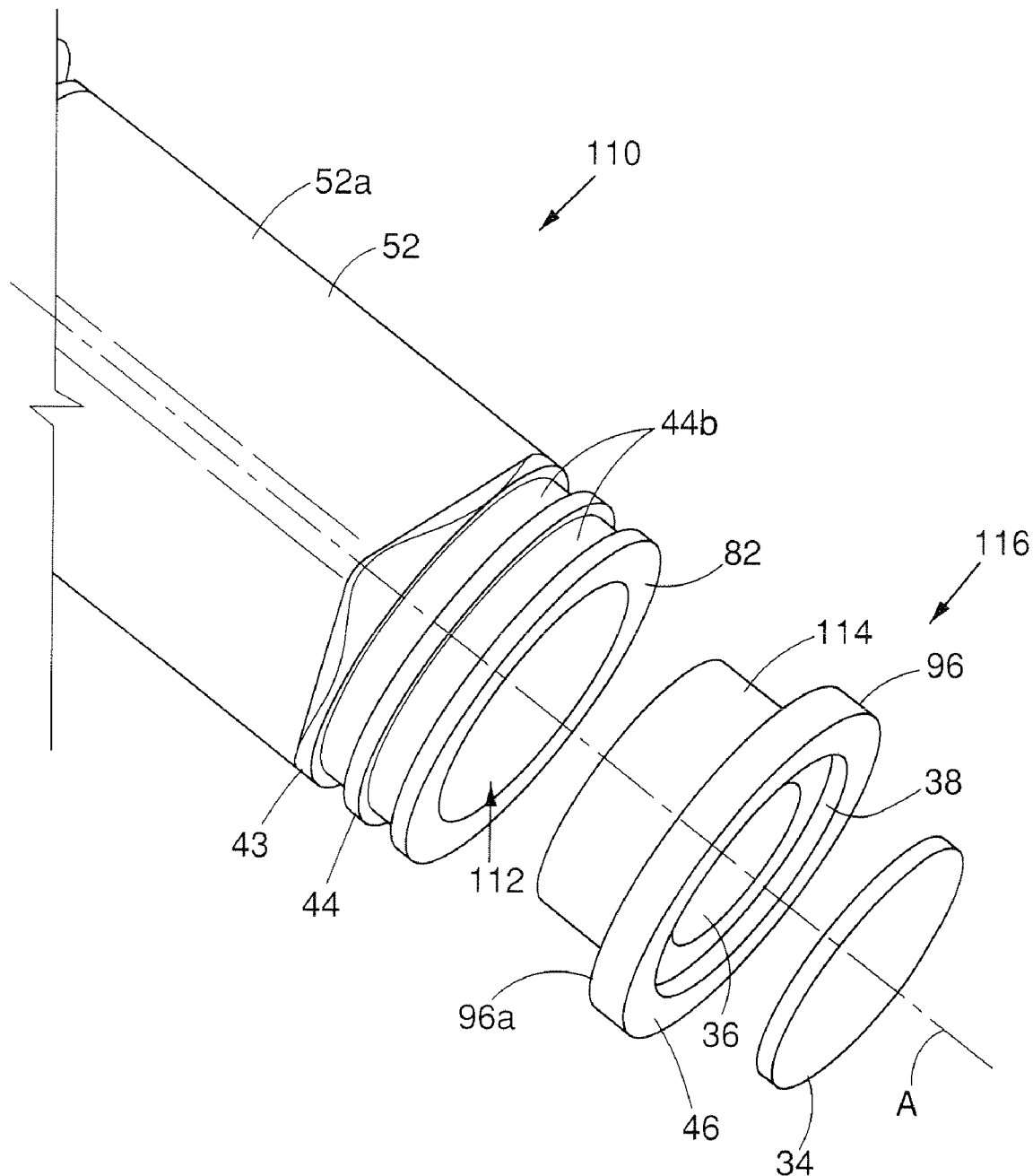
FIG. 14 is a perspective view of yet another embodiment of a camera insert and a window mount for the window.
Figure 15:
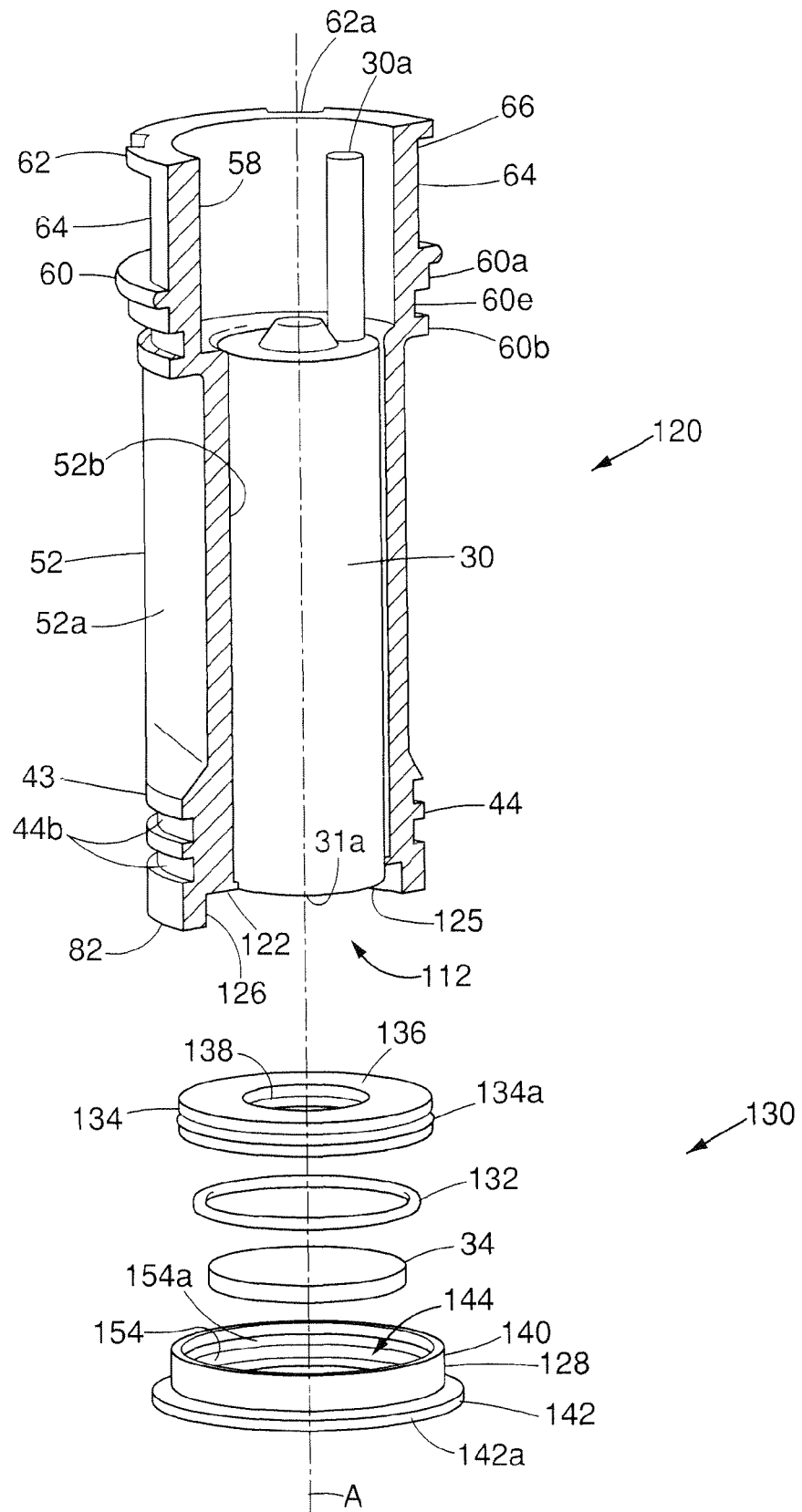
FIG. 15 is an exploded view of still another embodiment of a camera insert with a portion cut away, and a window mount for the window.
Figure 16:
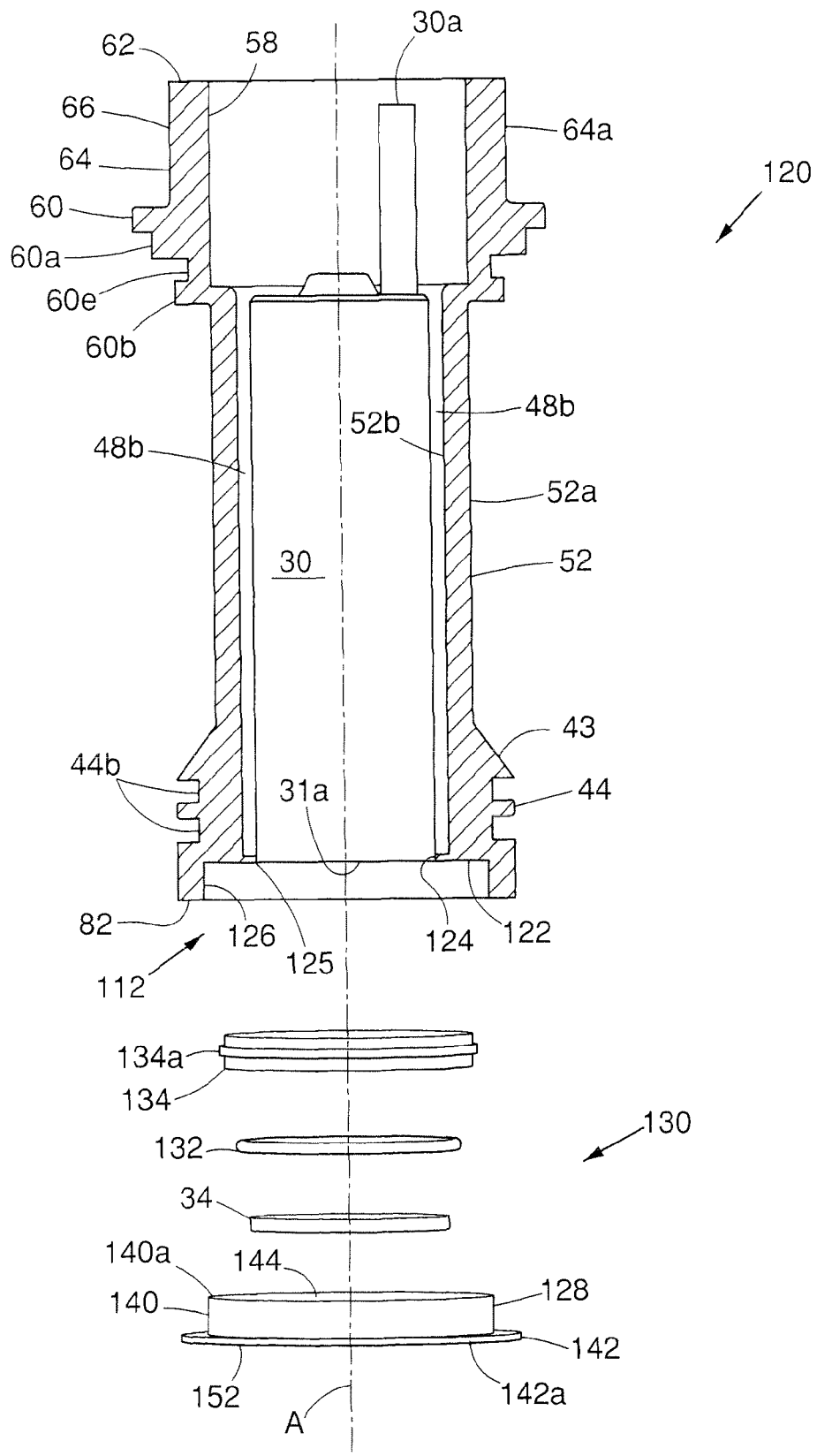
FIG. 16 is a side view of the exploded view of FIG. 15.

Referring to FIG. 14, camera insert 110 differs from camera insert 80 in that camera insert 110 includes a circular opening 112 for engaging window mount 116. The window mount 116 has a tubular or cylindrical neck or protrusion 114 which extends within and engages the circular opening 112. The window mount 116 can be adhered in place by adhesives.

In another embodiment, referring to FIGS. 15-18, camera insert 120 can be flexible and differs from camera insert 110 in that the first end 43 of camera insert 120 can have a circular bore or opening 112 with an inner diameter 126, an annular shoulder 122 forming a window mount seat or sealing surface, and an annular lip, ridge, shoulder or ring 124 extending radially inwardly from shoulder 122. The ring 124 can have an opening 125 which can engage around the perimeter of the camera 30 at end 31a, and can form a second or internal sealing region of the camera insert 120. A second or internal sealing region has been previously described with respect to camera insert 24. The ring 124 can also centrally position the camera 30 within the camera insert 120 in a spaced manner from inner wall surfaces 52b of mid portion 52.

A window mount 130 can be secured and sealed to the first end 43 of the camera insert 120 within opening 112 below the end 31a of camera 30. The window mount 130 can be generally rigid and can be an assembly that includes a generally rigid outer or lower window mount ring, housing, bushing or member 128, in which a window 34 is sealed and secured in place by a generally rigid window mount locking insert, ring or member 134. Mount member 128 and mount insert 134 can be made of the same materials as described for window mount 90.

Figure 17:
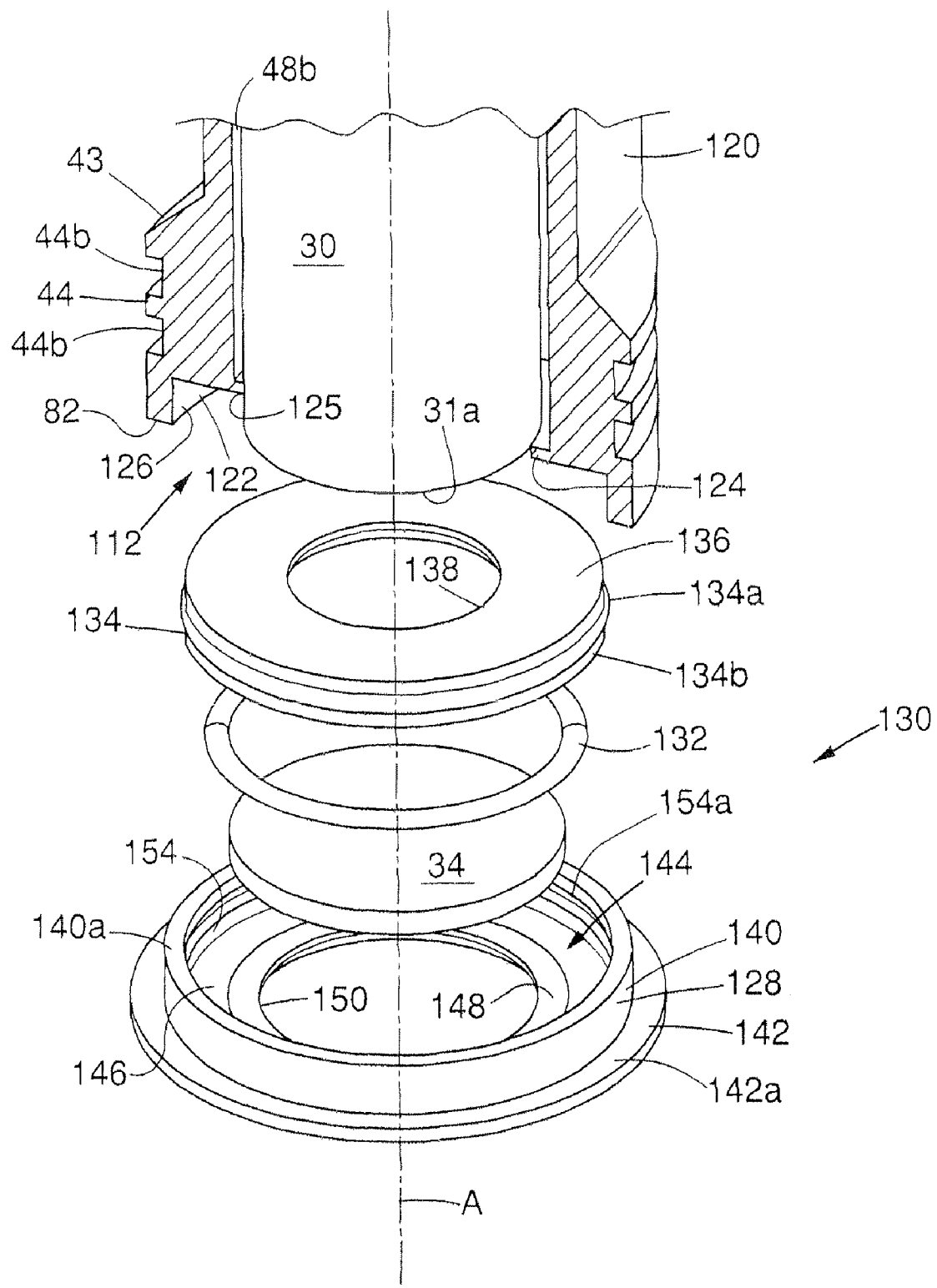
FIGS. 17 and 18 are enlarged exploded views of the window mount in FIG. 15.
Figure 18:
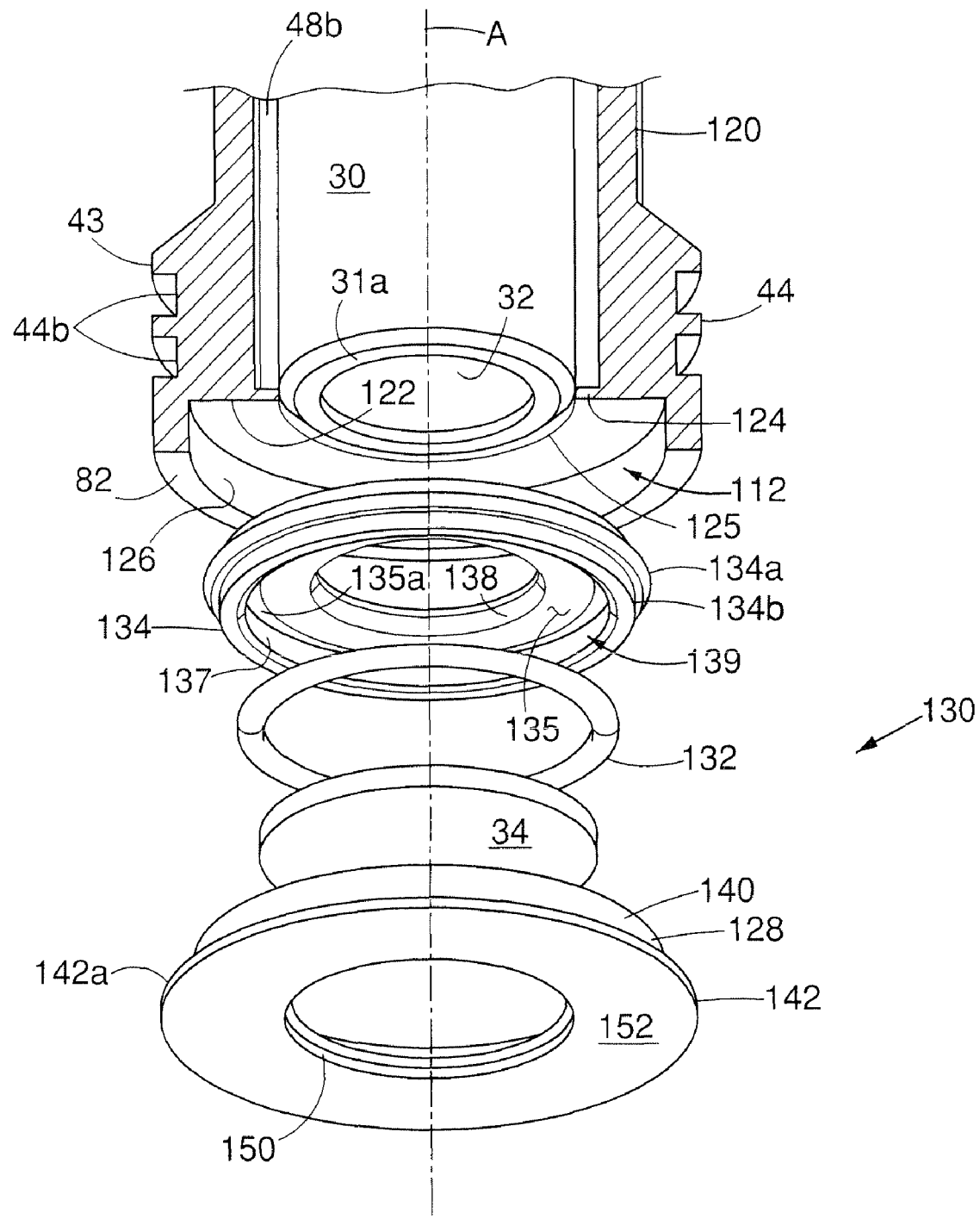

The mount member 128 can include a generally annular base 142 having a central viewing opening, aperture or hole 150 through bottom surface 152, and an annular flange or shoulder 142a (FIGS. 17 and 18). A generally cylindrical neck 140 can extend from the base 142, and define and surround a cavity 144. The bottom 146 of the cavity 144 can be defined by the base 142 and can have an annular recess or window seat 148 surrounding the hole 150, in which the window 34 can be seated and located over the hole 150. If desired, a washer or "O" ring can be positioned within seat 148 to provide sealing between the window 34 and the mount member 128.

The window 34 can be held, captured or trapped within the cavity 144 of mount member 128 by window mount insert 134. The mount insert 134 can be generally annular in shape with a central viewing aperture, opening or hole 138, and can have an outer diameter 134b which can engage and fit closely within the inner diameter 154 of the neck 140 of mount member 128. The outer diameter 134b of the mount insert 134 can have a locking member or structure 134a, for engaging a mating locking structure 154a on the neck 140 of the mount member 128. The locking member 134a can be an annular ridge protruding from the outer diameter 134b of the mount insert 134, and the mating locking structure 154a can be an annular groove within the inner diameter 154 of neck 140. Such an annular ridge can snap within the annular groove and lock the mount insert 134 within the mount member 128, thereby holding, trapping or locking the window 34 within the window mount 130. In other embodiments, the locking member 134a can be an "O" ring positioned on the outer diameter 134b of the mount insert 134 within an annular groove. Such an "O" ring can engage the annular groove locking structure 154a within the inner diameter 154 of the neck 140 for locking the mount insert 134 within the mount member 128, while at the same time providing sealing between the outer diameter 134b of the mount insert 134 and the inner diameter 154 of the neck 140 of the mount member 128. In other embodiments, the window mount 130, or portions thereof, can be made of flexible material. For example, the mount insert 134 can be made of resilient polymeric or rubber material and can also provide simultaneous locking and sealing.

The mount insert 134 can have a cavity 139 with an inner diameter 137 and an annular seat or shoulder 135. The inner diameter 137 can be sized to accept the window 34. Sealing between the window 34 and the shoulder 135 of the mount insert 134 can be provided by a sealing member such as a washer or "O" ring 132 positioned therebetween. The "O" ring 132 can be positioned within an annular recess or groove 135a in the shoulder 135. The height or depth of the cavity 139 can be sized, selected or adjusted such that when the mount insert 134 is locked in place within the mount member 128, the shoulder 135 can compress or force the window 34 against the window seat 148 and base 142 of the mount member 128, with the "O" ring 132 being resiliently compressed between the shoulder 135 and the window 34. The washer or "O" ring 132 and the groove 135a can also be sized to provide the desired compression. It is understood that other suitable securing and sealing structures and arrangements can be used for securing and sealing the components of the window mount 130 together.

When the window mount 130 is assembled, the window mount 130 can be inserted into opening 112 of camera insert 120, and can be sealed and secured in place with adhesives or sealants between some or all mating surfaces. The neck 140 of the mount member 128 can engage and seal against the inner diameter 126 of the opening 112, and the flange 142a can engage and seal against the axial bottom or end surface 82 of the first end 43. The upper surface 140a of the neck 140 of the mount member 128 and/or the upper surface 136 of the mount insert 134 can engage against and seal against shoulder 122. The end 31a of the camera 30 can contact or engage the surface 136 of the mount insert 134 of the window mount 130. Consequently, the window mount 130 can be positioned below the camera 30. If desired, sealant can be applied between the end 31a of the camera and surface 136. Sealing can also be provided between the end 31a of camera 30 and the mount insert 134, and in embodiments, the mount insert 134 can be formed of resilient polymeric material or has an upper surface 136 covered with such material. The hole 138, window 34 and hole 150 of window mount 130 can be positioned and sized to be aligned with the optical opening or lens 32 of camera 30 to provide suitable viewing for camera 30.

Although the components of window mount 130a have been shown to have various circular and annular features and shapes, it is understood that the other suitable shapes are possible, for example, polygonal, oval, etc., depending upon the situation at hand. The window 34 does not have to be round and can be polygonal or rectangular, for example. In addition, it is understood that other suitable securement or sealing structures can be employed. Furthermore, in some embodiments, the window mount can be formed of window material and a separate window 34 is not required.

Figure 19:
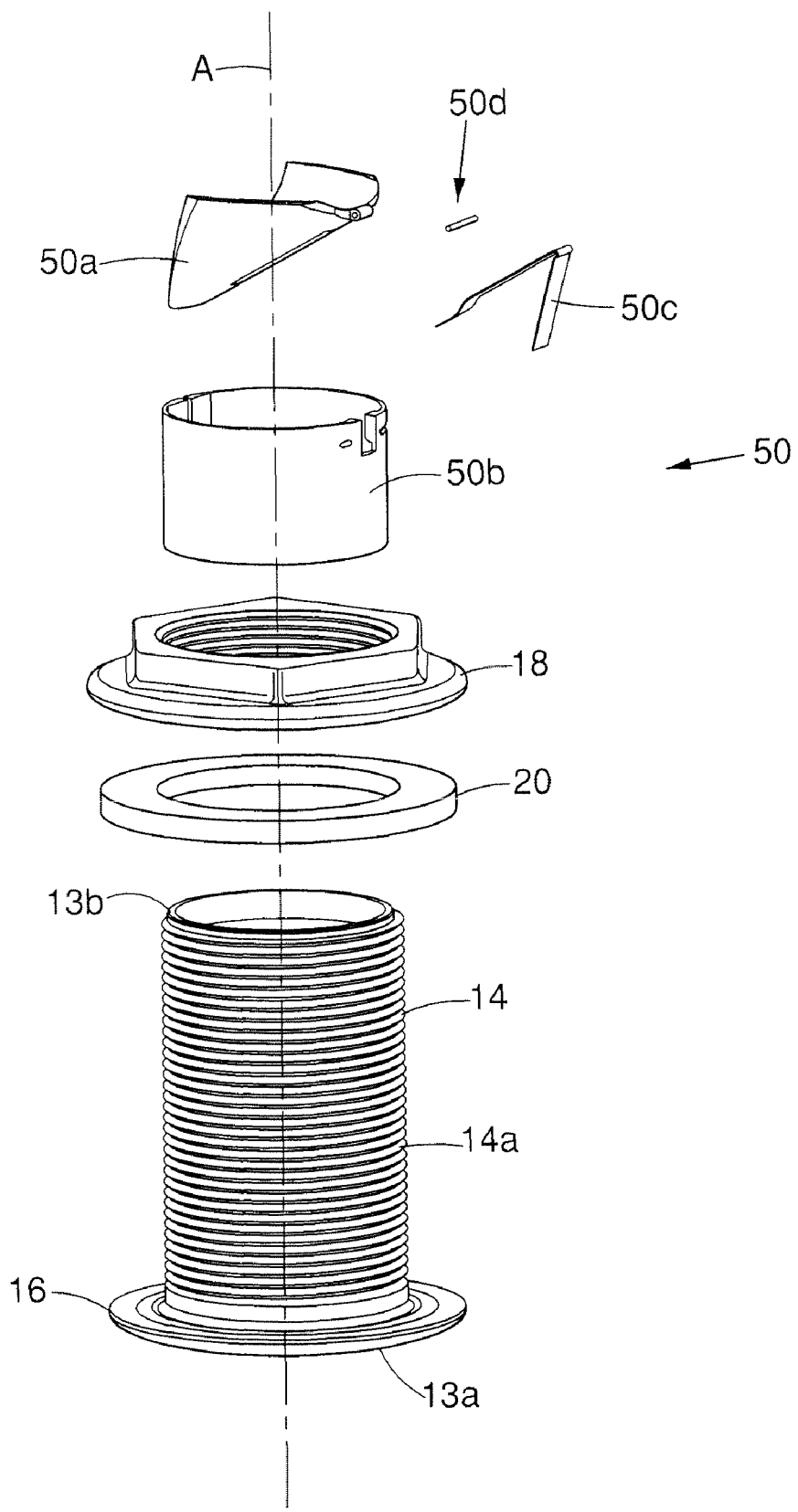
FIG. 19 is an exploded view showing an embodiment of the valve arrangement.

Referring to FIG. 19, embodiments of the valve arrangement 50 can have a valve member 50a that is spring loaded with a spring 50c such as a bent leaf spring that can be pivotably mounted about a pivot rod or axle 50d to sleeve 50b.

Figure 20:
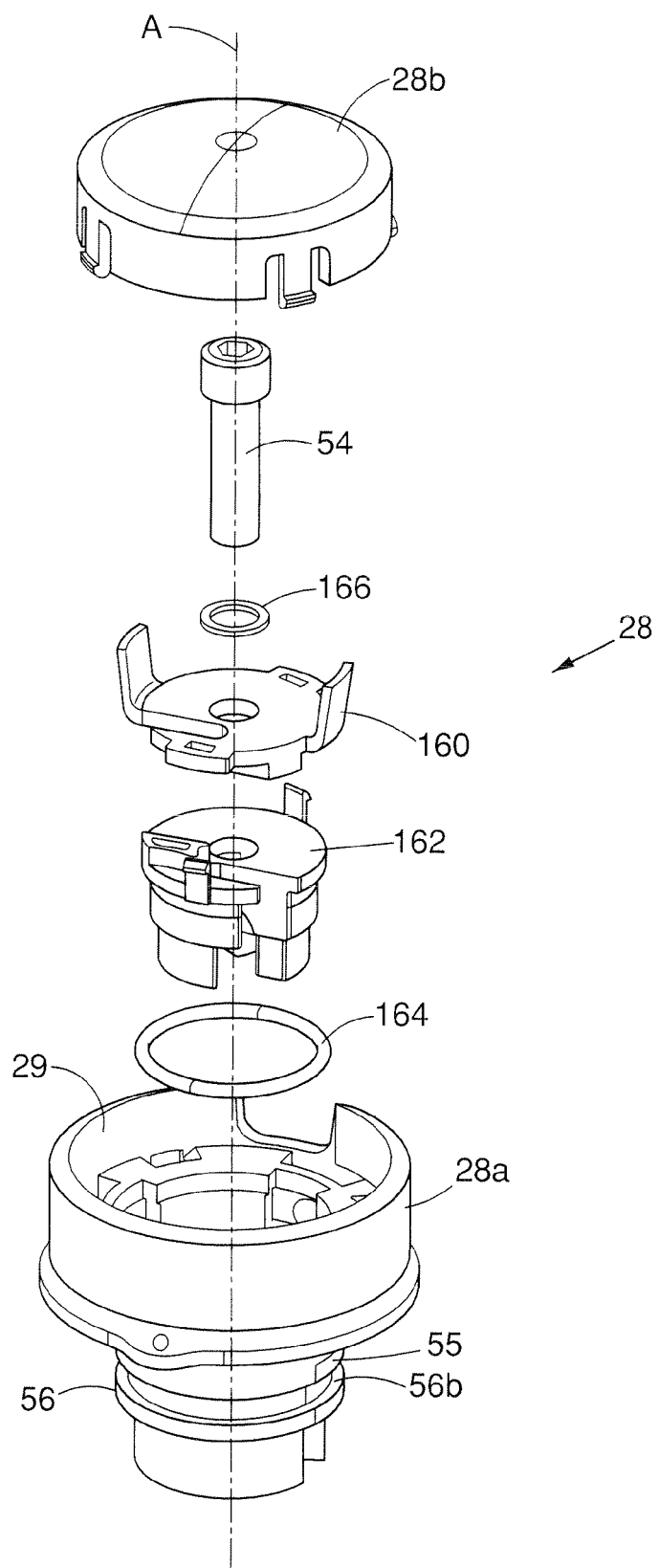
FIG. 20 is an exploded view showing an embodiment of the cap arrangement.

Referring to FIG. 20, embodiments of the cap arrangement 28 can include cable rings 160 and 162 which can be sealed within cap portion 28a with an "O" ring 164. Fastener 54 can be provided with a washer or "O" ring 166, and the neck 55 can be extended longer than seen in FIG. 5.

While this invention has been particularly shown and described with references to example embodiments thereof, it will be understood by those skilled in the art that various changes in form and details may be made therein without departing from the scope of the invention encompassed by the appended claims.

For example, although the present invention has been described for underwater use in watercraft, it is understood that embodiments of the present invention can be employed in aircraft, spacecraft, motor vehicles including trucks, cars, military vehicles, recreational vehicles, for buildings including interior and exterior environments, etc. Other uses include industrial environments such as viewing industrial processes, for example, flow through conduits and pipes. If desired, the air gaps 48*a* and 48*b* provided by camera insert 24 can be filled with a sealant, such as urethane, or a soft damping material such as a foam. Although camera inserts, for example, 24, 80, 100, 110 and 120, preferably have at least portions that are formed of resilient material, the camera inserts can be formed of rigid material and the square walls of the mid portion 52 can still provide some benefit. The camera 30 can also be covered with a material that dampens shock and vibration. Although portions of the camera inserts and passage 42 in the through hull housing 14 are described to be circular, in some embodiments, other desired shapes can be employed. In addition, the through hull housing 14 can in some embodiments be integrally formed in the hull 12. It is understood that other suitable locking and sealing configurations can be used. Also, camera 30 can be substituted with other operational or electrical devices such as a light or light unit or device, a sensor, or a transducer, such that the assemblies and inserts shown and described, can also be employed for housing such devices. In uses for transducers or sensors, for example, acoustic transducers or sensors, the window does not have to be optically transparent but can be transparent or transmissive for the desired aspects, such as acoustic soundwaves, etc.

What is claimed is:

1. An underwater camera assembly comprising:
   a through hull housing having a passage extending therethrough; and
   a flexible camera insert positioned within the passage of the through hull housing and having a first end with a viewing window secured thereto, and a first sealing region for sealing the passage in a water tight manner.

2. The underwater camera assembly of claim 1 in which the flexible camera insert is formed of a material and has a shape for damping vibration.

3. The underwater camera assembly of claim 2 in which the passage of the through hull housing has a circular cross section, the first sealing region of the flexible camera insert having a circular periphery for sealing within the passage, the flexible camera insert having a hollow mid portion extending from the first end and extending within the passage.

4. The underwater camera assembly of claim 3 in which the hollow mid portion has a polygonal outer periphery that forms air gaps between the hollow mid portion and the through hull housing.

5. The underwater camera assembly of claim 4 in which the outer periphery of the hollow mid portion is square.

6. The underwater camera assembly of claim 5 further comprising a camera positioned within the flexible camera insert and sealed to a second sealing region located within the first end, the camera extending within the hollow mid portion.

7. The underwater camera assembly of claim 6 which the camera is cylindrical and the hollow mid portion has square inner walls forming air gaps between the camera and the hollow mid portion.

8. The underwater camera assembly of claim 6 in which the flexible camera insert includes a second end extending from the hollow mid portion having a third sealing region for engaging a cap arrangement for sealing the camera within the flexible camera insert.

9. The underwater camera assembly of claim 8 further comprising a securement arrangement for securing the second end of the flexible camera insert to the through hull housing.

10. The underwater camera assembly of claim 2 in which the flexible camera insert is formed of thermoplastic material.

11. The underwater camera assembly of claim 1 further comprising a generally rigid window mount secured to the first end of the flexible camera insert, the viewing window being secured to the window mount.

12. The underwater camera assembly of claim 11 in which the window mount includes spline protrusions which engage a mating splined opening in the first end of the flexible camera insert.

13. The underwater camera assembly of claim 11 in which the window mount includes an outer mount member with a cavity, and a mount insert, the window being trapped within the cavity of the outer mount member by the mount insert.

14. A flexible camera insert for an underwater camera assembly comprising:
   a body formed of flexible material, the body having a first end with a viewing window secured thereto, and a first sealing region with a circular periphery for sealing within a passage through a hull,
   a second sealing region located within the first end for sealing to a camera;
   a hollow mid portion extending from the first end and having a rectangular outer periphery and rectangular inner walls; and
   a second end extending from the mid portion and having a third sealing region for engaging a cap arrangement for sealing the camera insert.

15. An underwater device assembly comprising:
   a through hull housing having a passage extending therethrough; and
   a flexible device insert positioned within the passage of the through hull housing and having a first end with a window secured thereto, and a first sealing region for sealing the passage in a water tight manner.

16. The underwater device assembly of claim 15 in which the device is an electrical device selected from the group consisting of a camera, a light, a transducer, and a sensor.

17. A flexible device insert for an underwater device assembly comprising:
   a body formed of flexible material, the body having a first end with a window secured thereto, and a first sealing region with a circular periphery for sealing within a passage through a hull,
   a second sealing region located within the first end for sealing to a device;
   a hollow mid portion extending from the first end and having a rectangular outer periphery and rectangular inner walls; and
   a second end extending from the mid portion and having a third sealing region for engaging a cap arrangement for sealing the device insert.

18. The flexible device insert of claim 17 in which the device is an electrical device selected from the group consisting of a camera, a light, a transducer, and a sensor.

19. A method of housing a camera underwater comprising:
   positioning a flexible camera insert within a passage of a through hull housing, the flexible camera insert having a first end with a viewing window secured thereto, and a first sealing region for sealing the passage in a water tight manner; and positioning a camera within the flexible camera insert.

20. The method of claim 19 further comprising forming the flexible camera insert of a material and of a shape for damping vibration.

21. The method of claim 20 further comprising:
providing the passage of the through hull housing with a circular cross section;
providing the first sealing region of the flexible camera insert with a circular periphery for sealing within the passage; and
extending the camera through a hollow mid portion of the flexible camera insert, the hollow mid portion extending from the first end.

22. The method of claim 21 further comprising providing the hollow mid portion with a polygonal outer periphery for forming air gaps between the hollow mid portion and the passage of the through hull housing.

23. The method of claim 22 further comprising providing the hollow mid portion with a square outer periphery.

24. The method of claim 23 further comprising sealing the camera to a second sealing region located in the first end of the flexible camera insert.

25. The method of claim 24 in which the camera is cylindrical, the method further comprising providing the hollow mid portion with square inner walls for forming air gaps between the camera and the hollow mid portion.

26. The method of claim 24 further comprising:
providing the flexible camera insert with a second end extending from the hollow mid portion and having a third sealing region; and
sealing the camera within the flexible camera insert by sealing a cap arrangement with the third sealing region.

27. The method of claim 26 further comprising securing the second end of the flexible camera insert to the through hull housing with a securement arrangement.

28. The method of claim 20 further comprising forming the flexible camera insert from thermoplastic material.

29. The method of claim 19 further comprising securing a generally rigid window mount to the first end of the flexible camera insert, the viewing window being secured to the window mount.

30. The method of claim 29 further comprising engaging spline protrusions of the window mount with a mating splined opening in the first end of the flexible camera insert.

31. The method of claim 29 in which the window mount includes an outer mount member with a cavity, and a mount insert, the method further comprising trapping the window within the cavity of the outer mount member with the mount insert.

32. A method of housing a camera comprising:
positioning the camera within a camera insert, the camera insert having a body formed of flexible material, the body having a first end with a viewing window secured thereto, and a first sealing region with a circular periphery for sealing within a through hull passage;
sealing the camera to a second sealing region located within the first end;
extending a hollow mid portion of the camera insert around the camera, the hollow mid portion extending from the first end and having a rectangular outer periphery and rectangular inner walls; and
extending a second end of the camera insert from the mid portion, the second end having a third sealing region for engaging a cap arrangement and sealing the camera within the camera insert.

* * * * *